United States Patent [19]

Erb

[11] Patent Number: 4,721,274
[45] Date of Patent: Jan. 26, 1988

[54] GIMBAL ASSEMBLY

[76] Inventor: Robert C. Erb, 435 Brockmont Dr., Glendale, Calif. 91202

[21] Appl. No.: 768,407

[22] Filed: Aug. 21, 1985

[51] Int. Cl.⁴ .......................... B60R 1/10; G02B 7/18
[52] U.S. Cl. .................................. 248/179; 350/636; 74/471 XY
[58] Field of Search ............... 248/179, 184, 476, 487; 350/636, 635; 74/502.1, 471 XY

[56] References Cited

U.S. PATENT DOCUMENTS

| | | | |
|---|---|---|---|
| 1,270,163 | 6/1918 | Jesurun et al. | 74/501 M |
| 1,570,888 | 1/1926 | Gray | 74/471 XY |
| 2,464,064 | 3/1949 | Thompson | 248/179 X |
| 3,517,904 | 6/1970 | Verchain | 248/179 X |
| 3,588,232 | 6/1971 | Mostel | 248/487 X |
| 3,642,353 | 2/1972 | Field | 248/179 X |
| 3,861,763 | 1/1975 | Perkins | 74/471 XY X |
| 4,103,560 | 8/1978 | Stoffel et al. | 74/501 M |
| 4,110,010 | 8/1978 | Hilton | 350/636 X |
| 4,279,473 | 7/1981 | Yamana | 350/635 |
| 4,375,631 | 3/1983 | Goldberg | 74/471 XY X |
| 4,406,525 | 9/1983 | Itoh et al. | 350/486 |
| 4,526,447 | 7/1985 | Taylor | 350/636 |
| 4,607,919 | 8/1986 | Gartner et al. | 74/471 XY |

FOREIGN PATENT DOCUMENTS

| | | | |
|---|---|---|---|
| 2360823 | 6/1974 | Fed. Rep. of Germany | 350/635 |
| 3232953 | 3/1984 | Fed. Rep. of Germany | 350/635 |

OTHER PUBLICATIONS

Oriel's New 1977 Precision Adjustable Mirror Mounts, Mar. 2, 1977, Oriel Corporation of America.

Primary Examiner—Ramon S. Britts
Assistant Examiner—Karen J. Chotkowski
Attorney, Agent, or Firm—Frank L. Zugelter

[57] ABSTRACT

A gimbal assembly mounted in a housing, particularly in a laser beam manipulator, by which the change of direction for a reflected beam or the like is measured in a second of a degree-of-arc in motion. An element such as a specular one including a mirror is mounted within a gimbal ring subassembly, the compound or universal motion of which is actuated by a member such as a shaft that is operatively connected to a swivable member mounted in a structural frame member. Such operative connection provides for the same change in direction for the laser beam as the change of direction of movement for means controlling the swivel element. Or, the actuating member can be fixed to the swivel member by which the element moves in a direction opposite to the direction of movement for the controlling means (joystick). Means are provided to apply pressure to and on the swivel member to thereby ease or make difficult the manipulation of the joystick, depending on the desire of the operator. Manipulation of the joystick results in minute movement for the element, effectively controlling in a very sensitive way a change of direction for the reflected beam.

12 Claims, 5 Drawing Figures

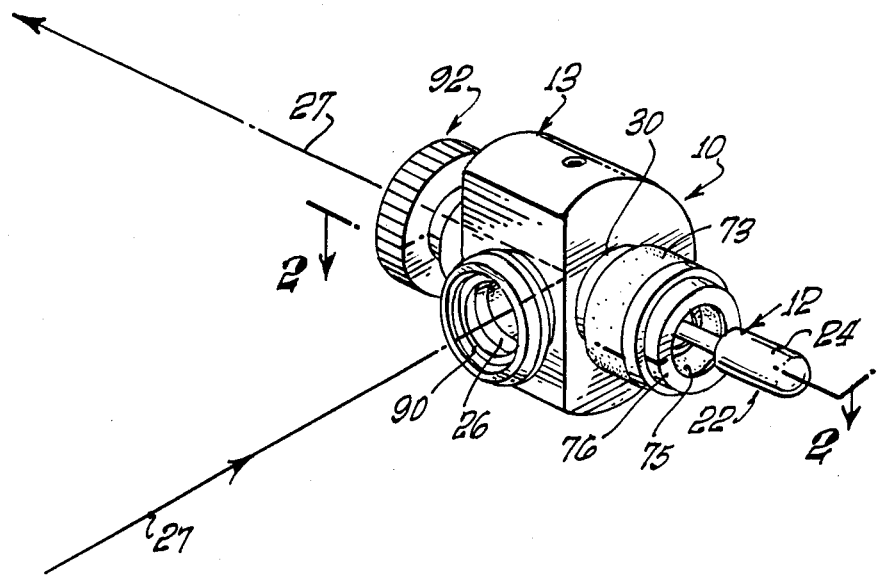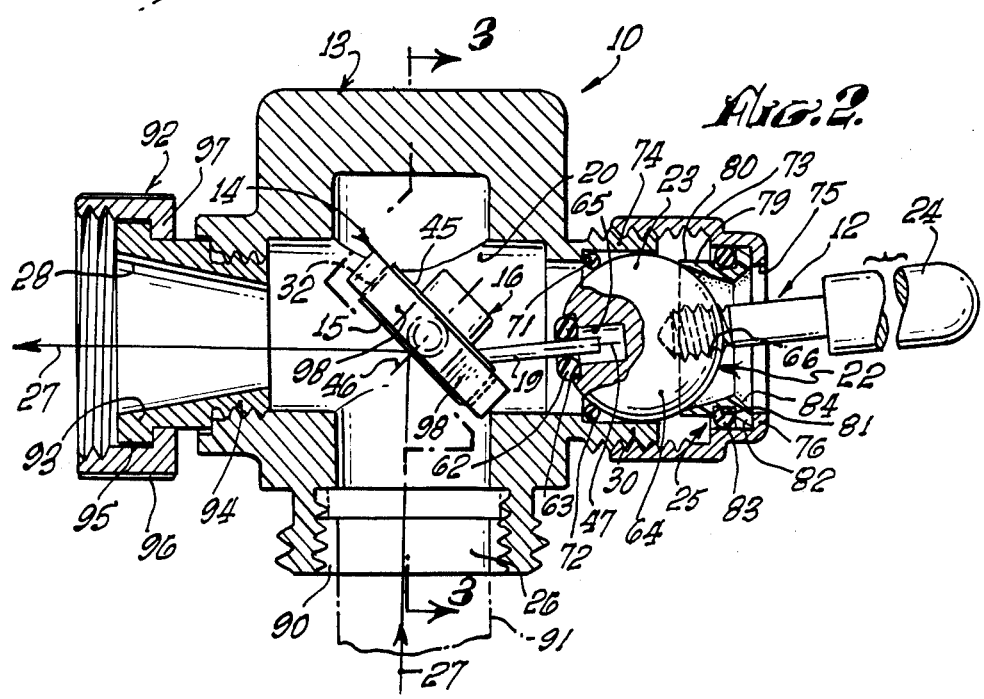

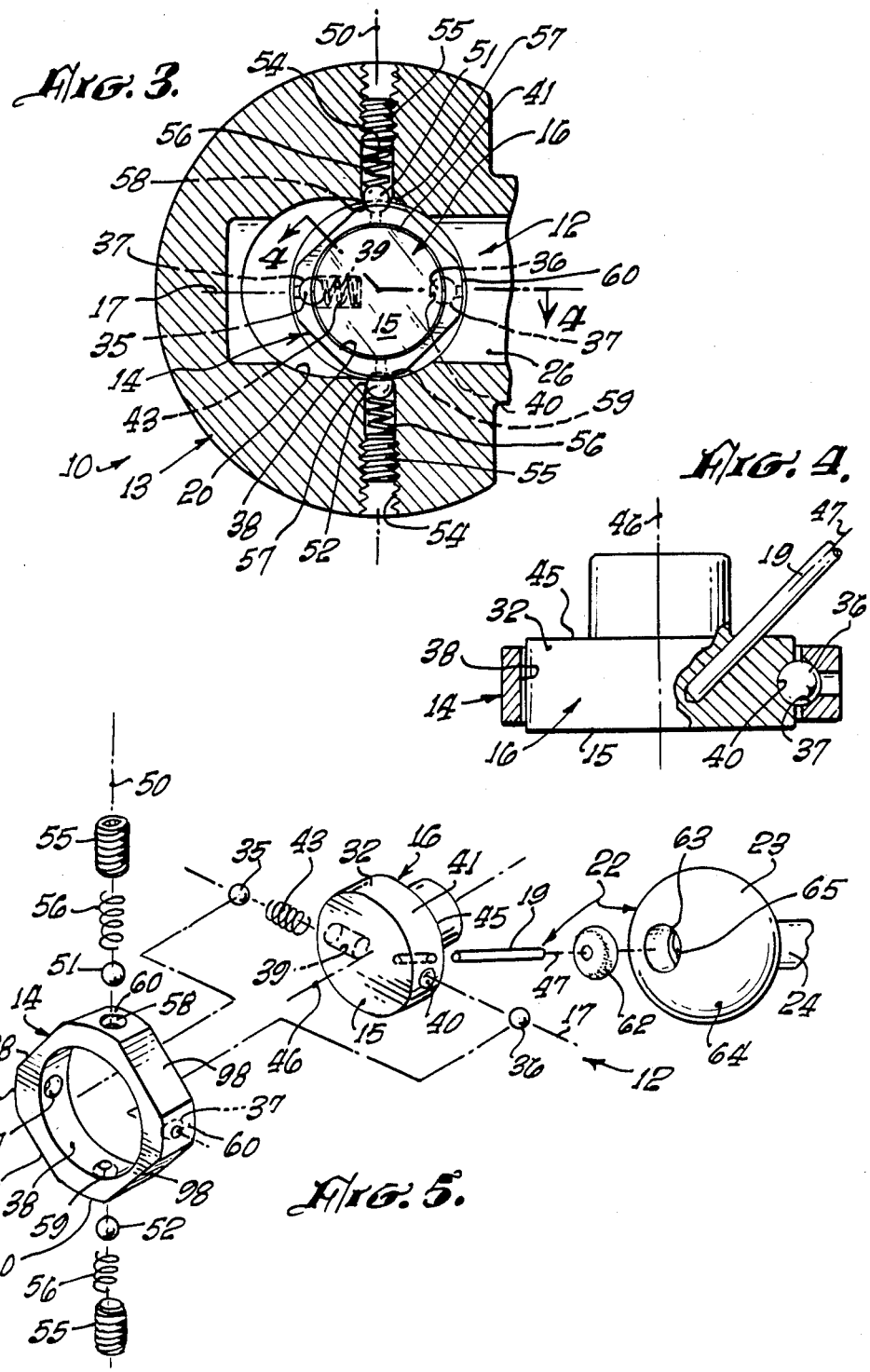

GIMBAL ASSEMBLY

TECHNICAL FIELD

This invention is directed to a gimbal assembly that is particularly adapted to the surgical field involving endoscopes of all kinds, as a laser beam micro manipulator. However, it is also readily adaptable for industrial and commerical purposes as well.

BACKGROUND

See: U.S. Pat. Nos. 3,198,071; 3,253,481; 3,369,427; 3,653,276; 3,942,879 and 4,406,525.

DISCLOSURE OF THE INVENTION

This invention is directed primarily to a gimbal assembly for adaptation in the utilization of endoscopes for surgical operations. However, it has application in other fields as well, particularly with respect to manipulating the direction of a laser beam and changing such direction in terms of a second-of-a-degree-of-arc of motion. Consequently, the subject matter of the invention can also be described as a laser macromanipulator.

This gimbal assembly or system provides for control in the change of direction of a reflected beam off of a mirror of a specular element. The specular element is mounted in a gimballed ring assembly for compound or universal motion therein, such motion produced by means of an actuating member or shaft operatively connecting the mirrored element to controlling means which swivels to cause change of direction for the shaft and the mirrored element. A "joystick" is provided to manually operate or manipulate a swivel member of the controlling means. The gimbal assembly is mounted within a housing having ingress and egress ports angularly oriented to one another, for introduction and discharge of the laser beam to strike and reflect from the mirror. Manipulation of the joystick provides the desired change of direction that is measureable in a second-of-arc motion.

Resilient means are provided for adjusting tension on the swivel member by which manipulation thereof through the joystick can be made easier or more difficult. A very fine change in direction in terms of a second-of-an-arc of motion is accomplished.

Heretofore, the problem of obtaining manual control to a very fine degree in the change of direction in a laser beam, particularly for surgical purposes, has not been accomplished or satisfactory. Particularly, in medical or surgical application, this is a requirement which the surgeon desires but has not found in previous devices which he manipulates. This problem is overcome in the invention disclosed herein.

It is an object of this invention to provide a unique, novel and efficient gimbal apparatus and system, readily adaptable to medical, commercial, and industrial applications.

A further object of this invention is to provide for a degree of a second-of-arc of motion for element, specular or otherwise, direction of a beam of light being changed in a satisfactory manner.

Another object of this invention is to achieve the same direction of motion for the gimbal assembly and for the elements therein as the direction provided for the means by which such assembly and such elements are moved.

Another object of this invention is to embody its concept in a gimbal assembly which can either reverse the effect of movement of the gimbal assembly to that of the means by which such gimbal assembly is articulated or directly correlate (moved in the same direction) the movement of such means with the movement of such gimble assembly.

A still further object of this invention is to provide a novel device embodying the inventive concept for controlling and directing a laser beam used in conjunction with an endoscope or other medical device in surgical, commercial or industrial procedures.

These and other objects and advantages of the invention will become more apparent by a complete and full reading of the following description taken in conjunction with the appended claims thereto and the accompanying drawing comprising two sheets of figures.

BRIEF DESCRIPTION OF THE DRAWING

FIG. 1 is a perspective view of subject matter incorporating the invention.

FIG. 2 is a view taken on line 2—2 of FIG. 1.

FIG. 3 is a view taken on line 3—3 of FIG. 2.

FIG. 4 is a view taken on line 4—4 of FIG. 3.

FIG. 5 is an exploded perspective view of elements incorporated within the subject matter of the invention.

BEST MODE OF CARRYING OUT THE INVENTION

Referring now to the drawing wherein reference characters associated with elements in each of the Figures refer to like numerals hereinafter. FIG. 1 shows an apparatus 10 incorporating the invention. Apparatus 10 more particularly is a gimbal assembly 12 embraced, FIG. 2, within a housing 13. Gimbal assembly 12 comprises, FIGS. 2-5, a ring 14 in which a mirror 15, included in a cylindrical member 16, is pivotally mounted thereto about a, say, horizontal axis 17, FIG. 5, a shaft or actuating member 19 secured to mirror 15, these elements being disposed or located within a chamber 20 formed in housing 13, and a controlling means 22 operatively connected to actuating member 19 and which causes a desired movement for mirror 15. Means 22 comprises a swivel member 23 by which member 19 is gripped and a lever or joystick 24 secured to swivel member 23. Further, a means 25 is operatively connected to means 22 to provide for a change or adjustment in tensing or loosening of the movement of joystick 24 in the operation of apparatus 10.

In more particularity, housing 13 comprises the chamber 20 for disposition of member 16 and its mirror 15, ring 14, and shaft 19, a first port 26, FIG. 1, adapted for ingress of a laser beam illustrated by arrow 27, the generator (not shown) for such beam adapted to connect to port 26, a second port 28, FIG. 2, through which the generated beam exits from chamber 20 upon reflection from mirror 15, and a mounting structure or frame 30 for supporting and retaining swivel member 23.

The mirror 15 is included in a specular element whose form is in the nature of a disk 32, FIG. 5, the mirror itself being mounted on its front wall. Disk 32 is mounted within ring 14 by means of a pair of freely rotatable ballbearing members 35, 36, each of which seats in a pocket 37, FIG. 5, formed in the interior wall 38 of ring 14 and bores 39, 40 formed radially inwardly of the annular wall 41 of disk 32, these pockets 37 and bores 39, 40 being in axial alignment with one another and co-axial with axis 17 in assembly. The one bore 39 in disk 32, shown in phantom in FIG. 5, is deeper in dimension than that of shallower bore 40 in order to contain a spring 43 therein and on which bearing member 35 is mounted. Thus in assembly of disk to ring, disk 32 is caused to move in the direction of axis 17, against spring 43, so that bearing member 36, already seated in its bore 40, can be introduced into its corresponding pocket 37 of ring 14. Shallow bore 40 is, of course, of a lesser depth than the diameter of member 36.

Shaft 19 is inserted through a suitable hole in a (back) wall 45, FIG. 4, of disk 32, and is fixedly attached, preferably by brasing, to disk 32, at an angular inclination to the longitudinal axis 46, FIGS. 4, 5, of disk 32, its own axis 47 preferably lying in the same plane, FIG. 2, containing the axes 46, 17 of the disk and ballbearing members 35, 36.

Ring member 14 is pivotally mounted to housing 13 about a, say, vertical, axis 50 to that of (horizontal) axis 17 by means of a pair of spring-biased ballbearing members 51, 52 mounted in corresponding bores 54, in swivel member 23, FIG. 3, and aligned in opposing fashion to one another and coaxially with axis 50. Each of bores 54 extends from the member 23's corresponding exterior surface to its chamber 20, with at least portions thereof being threaded for corresponding set screws 55 which retain corresponding springs 56 and ballbearings 51, 52 in proper assembled positions. An inwardly turned lip 57 is formed at the interior end of each bore 54 and on which ballbearing members 51, 52 sit yet project through and into chamber 20.

Ring 14 includes opposing coaxial aligned sockets 58, 59 in its annular wall 60 and in which ballbearing members 51, 52 correspondingly seat, being held therein by means of their corresponding biasing springs 56. Thus, ring 14 is capable of pivoting on members 51, 52 about axis 50.

In the position for disk 32 in chamber 20 after assembly of apparatus 10, shaft 19 extends, FIG. 2 in the direction of the swivel member 23 which takes the form, preferably, of a spherical ball. Shaft 19 is mounted thereto by means of a point along its length being gripped by an O-ring 62 seated in a recess 63 provided at its exterior surface 64, while the remainder of its length extends into a smaller bore 65 provided behind a shoulder forming the bottom of recess 63. Opposing bore 65 in member 23 is another bore 66, threaded, to which lever or joystick 24 is secured, as shown in FIG. 2.

Controlling means 22 is mounted in structural frame 30 formed in or otherwise provided for housing 13. Frame 30 includes a shoulder 71, FIG. 2, against which member 23 swivels under pressure, in operation of the device. A plastic ring 72 seats on shoulder 71 to enhance the degree of sliding action in engagement with member 23.

Member 23 of means 22 is maintained interiorly of frame 30 by means of a cap 73 threaded to a corresponding exteriorly-threaded wall 74 of frame 30. Cap 73 includes a central opening 75 in its top 76, through which joystick 24 extends for manipulation in operation of the device 10. However, between top 76 of cap 73 and member 23, tension means 25 is provided to adjust means 22 in its ease or difficulty of manipulation by joystick 24. Means 25 provides a very fine sensitivity to the operation of the gimbal assembly in that member 23 can swivel to a second-of-an-arc in motion while simultaneously eliminating the possibility of seizure of cap 73 upon member 23, for example, when cap 73 is in a more tightened position of frame 30 than when in a more loosened position on frame 30. Means 25 comprises a circular plastic collar member 79 which includes a ring-base portion 80 which seats on any portion of the surface of member 23. An annular groove 81 separates base 80 from a flat circular top portion 82 against which the top 76 of cap 73 presses. An O-ring 83 seats in groove 81. Top portion 82 is tapered or cut away as at 84 to provide as much lateral or swivelling movement for joystick 24 as possible in operation.

At port 26, FIGS, 1, 2, a threaded ring 90 is adapted to threadedly seat interiorly of the fabricated structure forming it and thereby retain in proper position a lens 91 (in phantom) which generally focuses a beam of light or laser light upon mirror 15. An adapting structural means 92 is suitably mounted to the fabricated structure forming port 28 and by which apparatus 10 is operatively connected to, for example, an endoscope (not shown), general or specific. An example of such means 92 comprises a collar 93 having threaded a step-down dimensional element 94 for attachment to threaded structure on housing 13 forming port 28, an annular end wall 95 on collar 93 of greater dimension than that of element 94, and a cap 96 with an annular flanged interiorly-threaded open top 97 which hooks onto end wall 95 as shown in FIG. 2. The endoscope thus can be threaded to cap 96.

In operation of apparatus 10, joystick 24 is grasped by the fingers of a hand (not shown), and moved or swivelled to cause ball member 23 to rotate about two axes, thereby providing a compound or universal motion for swivel means 23. Such axes are, first, an axis parallel to vertical axis 50 (i.e., perpendicular to the drawing plane of FIG. 2) and, second, an axis coincident with the axis of joystick 24. As joystick 24 is so moved, shaft 19 is actuated thereby causing a compound motion for disk 32 on the front wall of which mirror 15 is situated. This compound motion for disk 32 is directly correlated or corresponds to the compound motion for swivalling member 23. Disk 32 rotates about axis 17, in an up-and-down motion, while ring 14 pivots about its axis 50 in a side-to-side motion. This side-to-side motion of ring 14 also produces a corresponding side-to-side motion for disk 32 since the latter is connected to ring 14 by means of ballbearing members 35, 36. The consequent result, of course, is the controlled movement of mirror 15 by manipulation of joystick 24. Thus, as a laser or light beam enters port 26 from its generating unit (not shown) the beam generally focuses at objective lens 91 and then enters chamber 20 to strike mirror 15 and reflect therefrom into egress port 28. The manipulation of joystick 24 causes a change in direction of the exiting laser beam through port 28 at it is manipulated.

The ease or difficulty with which joystick 24 can be manipulated is controlled by the extent of pressure exerted by ball member 23 on frame 30; here, the extent of threaded connection of cap 73 with frame 30. By increasing the extent of such threaded connection, additional tension between the surface of swivel member 23 and collar member 79 occurs as pressure on O-ring 72 or frame 30 increases, thereby tightening the affected elements and making it more difficult to move or swivel joystick 24. On the other hand, by reducing the extent of connection between cap 73 and frame 30, i.e., by loosing cap 73, more ease and less difficulty in the moveability of swivelling of joystick 24 occurs.

It should now be apparent that a minute or "micro" movement, literally in terms of a second of a degree of arc, results in the operation of subject matter embodying the invention. Consequently, change in direction of the light or laser beam is controlled to a second of a degree of arc of change in its direction.

In the assembly of apparatus 10, shaft 19 is brazed to disk 32. Spring 43 is introduced into bore 39 of disk 32, ballbearing 35 following thereafter. Ballbearing 36 is introduced into its small bore 40. Thereafter, while holding ring 14 and grasping shaft 19, disk 32 is introduced into the central opening of ring 14, with ballbearing 35 being inserted into pocket 37. The disk 32 is caused to move, such as by pushing shaft 19, towards ballbearing 35, against the action of spring 43, and by so doing, the other ballbearing 36 in disk 32 is caused to move into the central opening of ring 14 and to immediately snap into its pocket 37. Thus, disk 32 is now pivotable in ring 14 about bearing members 35, 36.

Ballbearing members 51, 52, springs 56, and set screws 55 are introduced into bores 54 of housing 13. Ring 14, with the aforesaid described elements assembled thereto, is introduced into chamber 20 through the opening of frame 30, it being noted that annular wall 60 of ring 14 is reduced, if necessary, as at 98, FIG. 5, in order to clear the opening in frame 30. A needle-nose pliers is useful, by its grabbing shaft 19 during this step. Once ring 14 with its assembled elements are in chamber 20, with the needle-nose pliers holding shaft 19, and while housing 13 is held, the pockets 58, 59 in ring 14 are teased into position against bearing members 51, 52 held in place by lips 58, 59. Thus, the ring and its subassembly snaps into position quickly.

Plastic ring 72 is seated on shoulder 71 of frame 30. O-ring 62 is seated in recess 63. Joystick 24 is threaded to member 23 which then is introduced into the opening of frame 30, concurrently with shaft 19 frictionally sliding through O-ring 62 into bore 65 of member 23. Collar 79 and its mounted O-ring 83 are mounted interiorly of cap 73 and this subassembly is then threaded to frame 30 after joystick 24 has been thrust through opening 75 of cap 73. With adapter 92, apparatus 10 is mounted to a suitable beam or laser generator for the particular purpose or use presented to apparatus 10.

Suitable and known materials, such as aluminum, brass, stainless steel, Delcron plastic, are utilized to fabricate by known manufacturing processes and techniques the above descriped elements. Disk 32 of member 16 is formed from molybdenum having its surface 15 polished, to a finished laser-grade mirror.

Various changes and modifications may be made without affecting the spirit and scope of the invention as set out in the appended claims. For example, ball member 23 may be aspherical as well as spherical. Lips 57 at the base of bore 54 may be omitted. Shaft 19, illustrated in FIG. 5 to lie in the x-y plane formed by axis 17, 46, may also extend into the z-plane, as the inventive concept comprehends a position for shaft or actuating member 19 in any plane or combination of planes by which any desired motion (i.e., type of propulsion or inertia) for disk 32 or other element/mechanism is contemplated.

In analyzing operation of gimbal assembly 12, it is to be noted that as lever or joystick 24 is moved upwardly in the plane of FIG. 2 of the drawing, say, in a north direction, actuating member 23 rotates counter-clockwise, while disk 15 rotates clockwise which also is in a north direction i.e., changing the laser beam direction to the north. For surgical, or even other purposes, this is a desired motion result, as the change towards a north direction for disk 32 (and mirror 15) is the same as the surgeon's sense and understanding when he moves his hand and lever 24 in a north direction. On the other hand, the inventive concept comprehends fixing shaft 19 to actuating member 23, in which case disk 32 or other element or mechanism mounted and supported in the ring sub-assembly would revolve or rotate in a south direction when joystick 24 is moved in a northern direction.

What I claim to be patentably distinct is:

1. A gimbal assembly including a mirror element and comprising
    a ring adapted for pivotal mounting about a first axis,
    said mirror element pivotally mounted in and to said ring about a second axis,
    a shaft attached to said mirror element for actuating it in motions about the first and second axes,
    a structural frame member,
    swivel means mounted in said frame member operatively connected to and controlling said shaft,
    means mounted on said structural frame member for maintaining said swivel means therein,
    said shaft being attached to said mirror element at an angular inclination relative to the axis of said element,
    said swivel means comprising
    (1) a swivel member having a bore,
    (2) gripping means mounted on said swivel member about said bore and gripping said shaft which extends freely into said bore, and
    (3) lever means connected to said swivel member in opposing relation to said bore.

2. The gimbal assembly of claim 1 wherein said maintaining means includes
    means for tightening said swivel member to adjust the ease or difficulty of swiveling said swivel member.

3. The gimbal assembly of claim 2 wherein
    said tightening means comprises
    a collar having a base portion engaging said swivel member and a top portion in engagement with said maintaining means of said structural frame member,
    said lever means extending through said collar and maintaining means.

4. The gimbal assembly of claim 3 wherein an O-ring or the like encircles said top portion to engage said maintaining means.

5. The gimbal assembly of claim 4 including a circular member engaging said swivel member and seating in the frame member.

6. The gimbal assembly of claim 1 or claim 2 or claim 3 or claim 4 or claim 5
    in combination with a housing mounted on said structural frame member,
    said housing having a chamber and first and second ports communicating with said chamber and being angularly oriented to one another,
    said ring being pivotally mounted to said housing in said chamber,
    the motions of said mirror element providing for a change of direction of light reflected therefrom through one of said ports.

7. In the combination of claim 6,
    said ring including opposing sockets, said mirror element having first and second bores, ballbearings seated in said sockets and bores whereby said mirror element pivots in said ring about the second axis.

8. In the combination of claim 7, one of said bores being deeper than the other, a biasing spring mounted in the deeper bore and on which one of said ballbearings seats.

9. In the combination of claim 8, said housing including corresponding ballbearings, biasing springs and set screws in opposing bores mounted on the first axis, corresponding sockets formed in said ring along the first axis, said ballbearings seated in said bores and sockets, whereby said ring pivots in said chamber about said housing.

10. In the combination of claim 7, said housing including corresponding ballbearings, biasing springs and set screws in opposing bores mounted on the first axis, corresponding sockets formed in said ring along the first axis, said ballbearings seated in said bores and sockets, whereby said ring pivots in said chamber about said housing.

11. In the combination of claim 10, inturned lips formed on said bores, the ballbearings projecting beyond such lips into the chamber.

12. In the combination 10, inturned lips formed on said bores, the ballbearings projecting beyond such lips into the chamber.

* * * * *